US009867379B2

(12) United States Patent
Strozzi

(10) Patent No.: US 9,867,379 B2
(45) Date of Patent: Jan. 16, 2018

(54) SOPES DISH FORMING MACHINE

(71) Applicant: Armando Strozzi, Mira Loma, CA (US)

(72) Inventor: Armando Strozzi, Mira Loma, CA (US)

( * ) Notice: Subject to any disclaimer, the term of this patent is extended or adjusted under 35 U.S.C. 154(b) by 427 days.

(21) Appl. No.: 14/615,214

(22) Filed: Feb. 5, 2015

(65) Prior Publication Data

US 2015/0223475 A1    Aug. 13, 2015

Related U.S. Application Data

(60) Provisional application No. 61/937,917, filed on Feb. 10, 2014.

(51) Int. Cl.
| | |
|---|---|
| *A21C 11/00* | (2006.01) |
| *A23P 1/10* | (2006.01) |
| *A21C 15/00* | (2006.01) |
| *A23P 30/10* | (2016.01) |

(52) U.S. Cl.
CPC .......... *A21C 11/006* (2013.01); *A21C 15/007* (2013.01); *A23P 30/10* (2016.08)

(58) Field of Classification Search
CPC ...... A21C 11/006; A21C 15/007; A23P 30/10; A23P 10/10
USPC .................................................. 425/344, 345
See application file for complete search history.

(56) References Cited

U.S. PATENT DOCUMENTS

| | | | |
|---|---|---|---|
| 1,971,087 A | 8/1933 | Werner | |
| 2,167,388 A | 7/1939 | Kremmling | |
| 3,417,713 A | 12/1968 | Schwebel | |
| 3,766,846 A | 10/1973 | Jimenez | |
| 3,963,402 A | 6/1976 | Berta | |
| 4,184,418 A * | 1/1980 | Jimenez | A21B 5/08 99/353 |
| 4,380,191 A | 4/1983 | Gallegos et al. | |
| 4,634,365 A | 1/1987 | Triporo | |
| 4,800,807 A | 1/1989 | Mani | |
| 5,074,778 A | 12/1991 | Betts, Jr. et al. | |
| 5,103,719 A | 4/1992 | Mani | |
| 5,673,609 A | 10/1997 | Sanchez et al. | |
| 5,919,508 A | 7/1999 | Donnelly et al. | |
| 7,178,456 B1 | 2/2007 | Bryan | |
| 7,700,143 B2 | 4/2010 | Baylor et al. | |
| 7,789,644 B2 | 9/2010 | Mihalos et al. | |

* cited by examiner

*Primary Examiner* — Alison L Hindenlang
*Assistant Examiner* — Mohamed K Ahmed Ali
(74) *Attorney, Agent, or Firm* — Kirk A. Buhler; Buhler & Associates

(57) ABSTRACT

Improvements a machine that turns gorditas into sopes. The machine uses an elliptical chain drive that transports the sopes. The gorditas travel horizontally where the gorditas are turned into sopes as they continue along the linear travel of the elliptical chain drive. The holder is a female pocket that accepts the gorditas and provides support at the sides of the sopes. A rotary press placed along the travel of the gorditas as they become sopes. The rotary press is synchronized to rotate and press into holders. The machine include leveling arms or pads that level the female pocket with the gorditas is loaded, pressed and ejected. The forming machine flips the sopes out of the female holder after the sopes has been formed with a central pocket.

19 Claims, 4 Drawing Sheets

SOPES DISH FORMING MACHINE

CROSS REFERENCE TO RELATED APPLICATIONS

This application is a continuation-in-part of applicant's co-pending application Ser. No. 61/937,917 filed Feb. 10, 2014 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a forming machine for a sopes food product. More particularly, the present machine receives semi-cooked gorditas and creates a dish cavity in the gorditas using a continuous conveyor system wherein the sopes can later be filed by the end customer.

Description of Related Art Including Information Disclosed Under 37 CFR 1.97 and 1.98.

Sopes are Aztec cuisine made from corn (masa) flour cakes and are topped with a variety of items from just beans and cheese, to eggs, shredded chicken or beef, vegetables picadillo, or even just guacamole. Sopes make a great appetizer because of their small size. Making any recipes involving homemade dough can seem like an intimidating task to some, but I assure you the corn mesa flour used in these Mexican recipes is a pure joy to use. The sopes are formed from corn balls that are pressed into flattened circles. The flattened circles are then lightly cooked on both sides and then the outer edge is pinched to form a raised edge.

Several food products use a raised outer ridge to keep toppings within an inner surface. In high volume production the process needs to be performed in a rapid manner where some form of automation increases the efficiency and the rate of production. A number of machines have been made that form a raise outer surface have been issued or published. Exemplary examples of patents and or publication that try to address this/these problem(s) are identified and discussed below.

U.S. Pat. No. 3,963,402 issued on Jun. 15, 1976 for Peter Berta discloses a method for shaping shells for hors d'oevres. The method uses an upper male and a lower female dies that where a sheet of dough is placed and pressed together in a matrix that forms multiple shells at a single time. While this patent covers a machine that makes shells, the shells are made from dough and provide an even wall section without a flat lower surface. The machine requires an even sheet of dough and does not use an individual disc of pre-cooked dough.

U.S. Pat. No. 4,634,365 issued on Jan. 6, 1987 for Pedro R. Triporo et al discloses an Apparatus for Making Pizza. The apparatus uses a flat-bed conveyor where trays of pizza move around an arc where a series of vertical rods push into the pizza to texture the top surface of the pizza. While this apparatus forms the top surface of dough it does not operate in a linear conveyor where the dough is pressed in a linear rolling motion.

U.S. Pat. No. 5,074,778 issued on Dec. 24, 1991 for David E. Betts, Jr. et al discloses a Pizza Crust Dough Forming Die Assembly. The assembly accepts a round dough ball that is placed central to the forming die. The top die closes vertically onto the lower die and the dough is squeezed to fill the forming die. Because the dough is squeezed between two dies the volume of the ball of dough must be accurately maintained to ensure that the pizza is completely filled without being over filled where excess dough is squeezed out of the die.

U.S. Pat. No. 5,919,508 issued on Jul. 6, 1999 for Davis A. Donnelly et al discloses a Process for Forming Dough Foodstuffs. The process starts with a dough ball placed on an oven safe sheet. The dough is the pressed with a vertical press to form pizza crust, rolls or loaves of bread. While this process forms the uncooked dough products, it required the uncooked dough product to expand as it rises. The dough is not partially cooked and then pressed to set the base and raised outer surface.

What is needed is sopes press that operates on a conveyor belt system where the gorditas are loaded into female trays and then a male tray compresses the gorditas into a sopes. The proposed sopes dish forming machine provides the solution with a conveyor forms the sopes for resale.

BRIEF SUMMARY OF THE INVENTION

It is an object of the sopes dish forming machine to use an elliptical chain drive that transports the sopes. The elliptical chain drive provides an elongated distance where the gorditas can be placed into holders at one side at the beginning of linear travel. The gorditas travel horizontally where the gorditas are turned into sopes as they continue along the linear travel of the elliptical chain drive. The holder is a female pocket that accepts the gorditas and provides support at the sides of the sopes. The linear travel allows for additional processes to be imposed onto the gorditas or sopes as they travel from a loading to an unloading location.

It is an object of the sopes dish forming machine to utilize a rotary press placed along the travel of the gorditas as they become sopes. The rotary press is linear with the travel of the elliptical chain drive. The rotary press is synchronized to rotate and press into holders. The press is a male former that forms the recessed female pocket in the sopes and is basically a rolling shoe that clears the outer lip of the female pocket, presses the sopes shape and then rolls out of the opposing outer lip of the female pocket.

It is another object of the sopes dish forming machine to include leveling arms or pads that level the female pocket with the gorditas is loaded, pressed and ejected. Because the drive system is a chain drive that transports the holders along the center of the female pocket. The leveling arms or guides are placed on the distal sides of the female holder to keep the female holder horizontal. The leveling arms or guides are placed to allow an operator to set a gorditas, at a location where the gorditas is turned into a sopes and where the sopes is unloaded or had additional processes performed.

It is still another object of the sopes dish forming machine to flip the sopes out of the female holder after the sopes has been formed with a central pocket. This is performed as the female holder travels around one of the rounded ends of the elliptical drive and the sopes fall out of the female holder onto a conveyor system.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
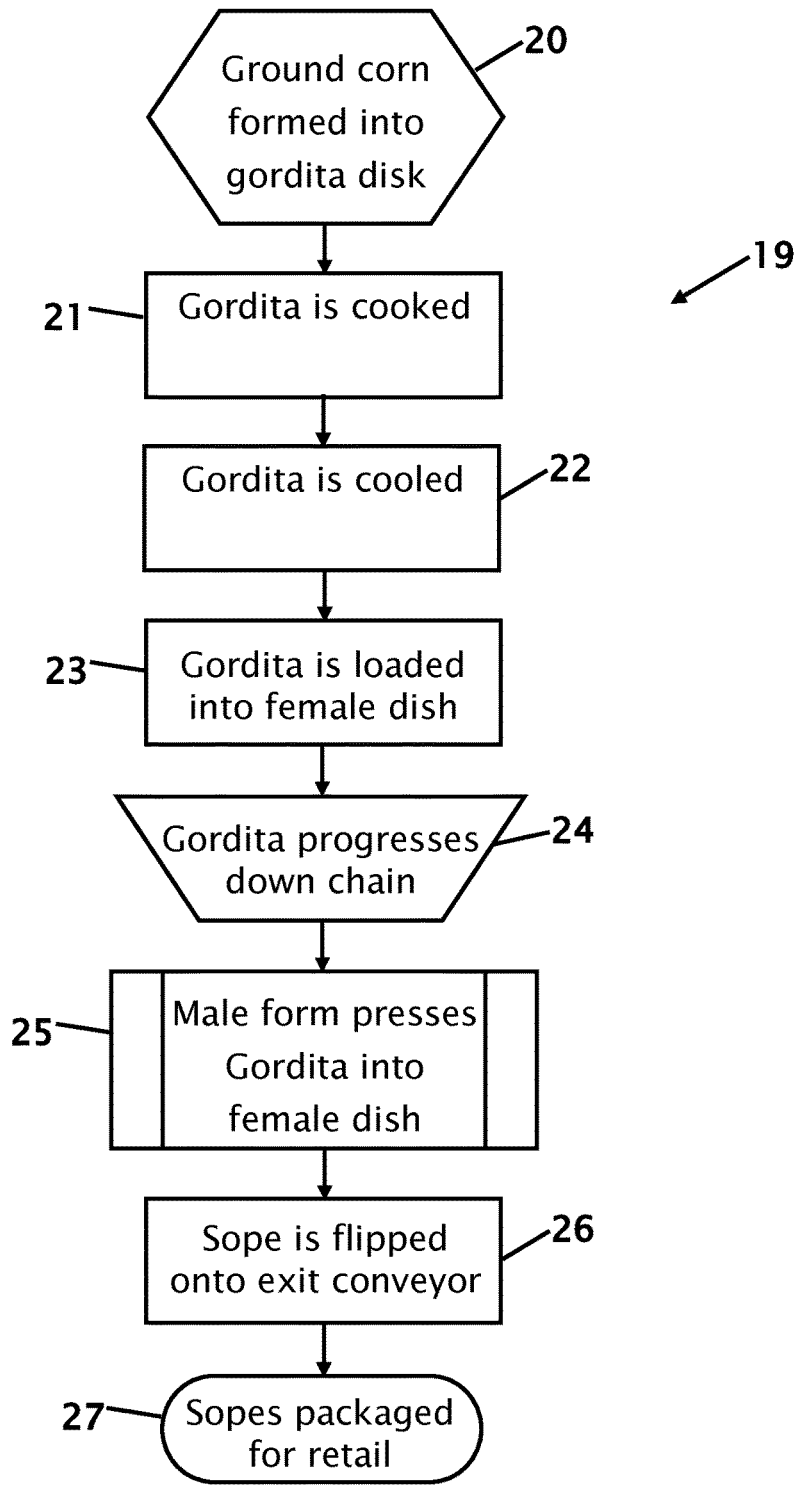
FIG. 1 shows a flow chart 19 for making sopes.

FIG. 1 shows a flow chart for making sopes. Corn is ground and mixed with other ingredients to form dough. The corn dough is either formed into a ball of rolled flat or then cut with a round die into a flat disk to form a corn gordita 20. Before the sope is formed, the gordita comes out of an oven where it is partially or completely cooked in an over where it is in the corn "gordita" stage 22. The "gordita" then travels on a cooling conveyor to the Sope Machine area where someone a person or robot selects individual gorditas and then places 23 the individual "gorditas" into one of the female receiving dish on the sope machine molds.

These female dishes are agar dish-shapes attached on a primary chain that acts as a conveyor 24. Simultaneously a secondary chain acting as a conveyor on an opposite direction with smaller diameter flat surface male buttons that engage meets with the female receiving dish to press 25 the "gordita" for a couple of seconds to turn the gorditas into a sope.

Once the sope is formed 25 it is then dropped 26 on to a Teflon or equivalent band that returns the sope to the beginning of the cooling conveyor, giving the sope extra cooling time prior to packaging the sopes for retail sale where the conveyor delivers the cooled sopes where they are packed.

Figure 2:
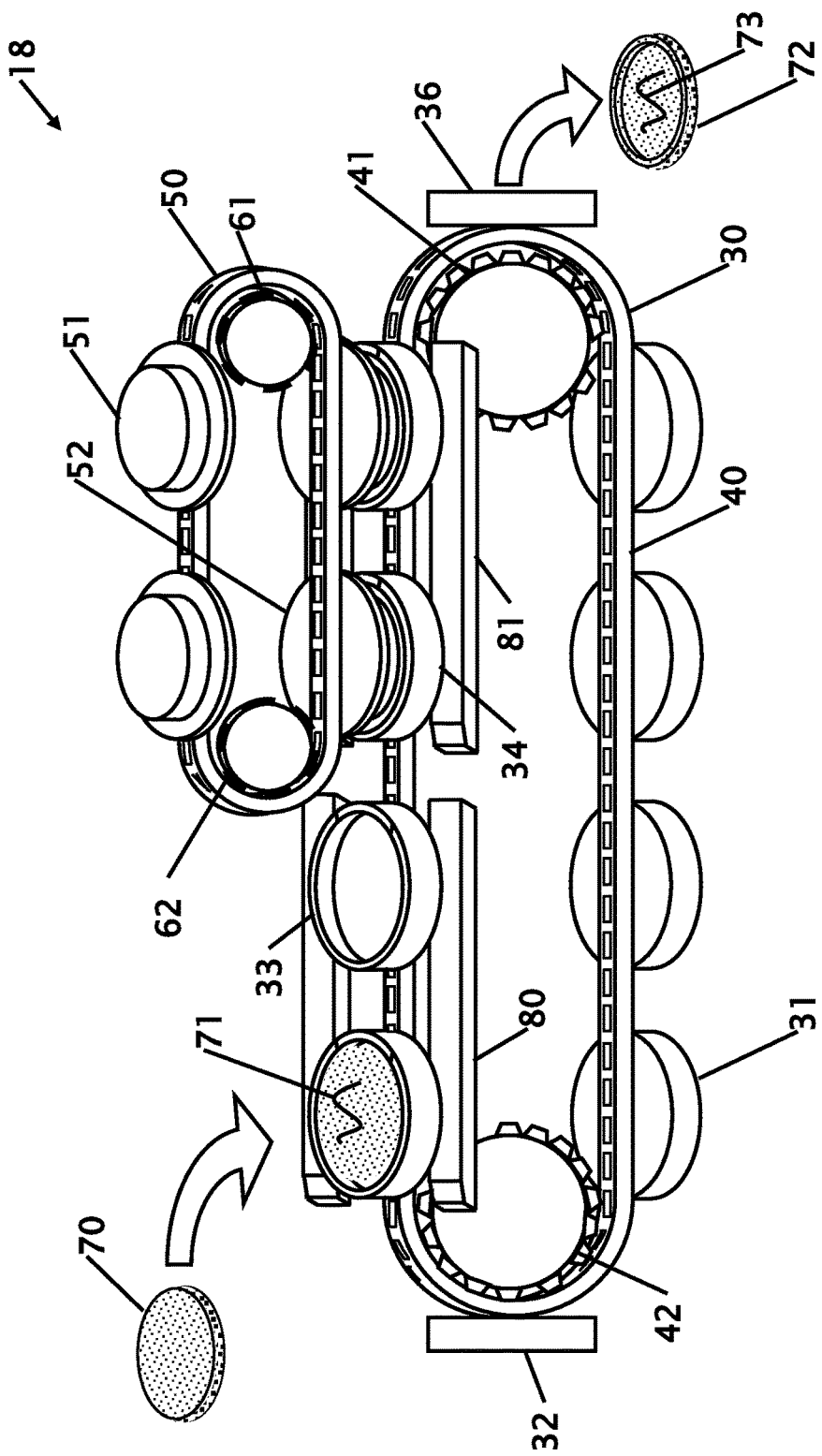
FIG. 2 shows the track system for the sope fabrication machine without the drive mechanism.
Figure 3:
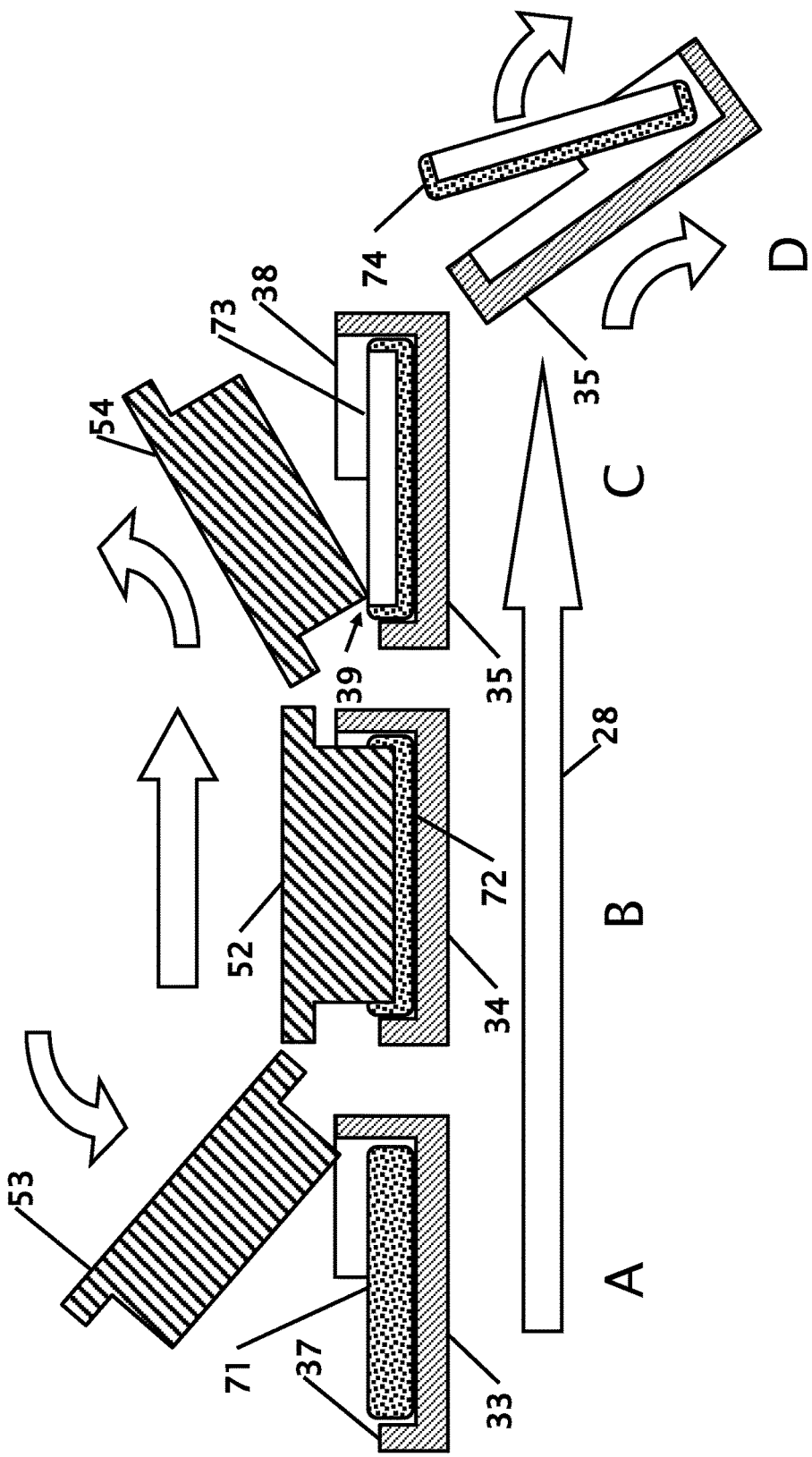
FIG. 3 shows a cross sectional view of the female and male forming dies.

FIG. 2 shows the track system for the sope fabrication machine without the drive mechanism and FIG. 3 shows a cross-sectional view of the female and male forming dies. The primary drive system 30 is essentially an elliptical linked chain with drive sprocket 41 and idle sprocket 42. A number of female dishes 31, 32, 33, 34 and 36 are secured onto the primary drive system 30.

A secondary drive system 50 is essentially another elliptical linked chain. The secondary drive system 50 has less male dies 51 than the number of female dishes found on the primary drive system 30. The secondary system 50 is also essentially an elliptical linked chain 40 with drive sprocket 61 and idle sprocket 62 with a plurality of male die formers 51 and 52. The secondary drive 50 is offset from the primary drive system 30. The shorter secondary drive 50 allows an area for the primary drive for some dishes 33 to be exposed for loading of the gorditas 70 and 71 onto the female dish(es).

Because the primary drive 30 is a narrow linked chain the chain can tip from side-to-side. To prevent the tipping at some parts of the travel leveling platforms 80 exist to level the female dish(es) 31 when the gorditas is being placed onto the female dish 33. A secondary set of leveling platforms 81 exist where the gordita is being press by the male die 52 to make an impression on the interior of the gordita thereby turning the gordita into a sope 72 with a depressed interior area 73 with elevated sides.

FIG. 3 shows the female dishes 33-35 progressing horizontally 28. The gordita 71 is shown in the first location "A". The heel of the male die 53 rotates down and into the female dish 53. In location "B" both the female 34 and the male 52 progress together. In location "C" the male die 54 rotates and lifts out of the female dish 35 the male die rotates fairly vertically out of the female dish and the trailing edge of the female dish 35 is lower than the leading edge 38 of the female dish the clear the trailing edge 37 of the male die 54 to prevent the female and male dies to interfere 39. After the sope is formed the female dish 35 rotates around sprocket 41 the sope 74 is dropped out of the female forming plate where it is transported for further cooling.

The female dish is essentially a dish shape with a flat central area and raised outer sides. The flat central area is sized to approximate the outside diameter of the gorditas/sope. Because the gorditas is partially or completely cooked and still slightly warm to accept the impression from the male forming die. The female dish is made from a food grade metal or plastic such as but not limited to Delrin, acetyl, nylon, PVC, ABS, Teflon, aluminum and stainless steel. It is contemplated that the female dish can be treated to prevent or reduce the formed sope from sticking to the inside of the female forming dish. It is further contemplated that the interior bottom surface of the female dish can be coated with a flavor, spice or seeds that will be embedded into the outer surface of the sope.

The male die has a flat top surface. An inner solid cylinder extends down from the flat top surface. The solid inner cylinder is smaller in diameter than the inside diameter of the side walls of the female dish. The difference between the two diameters allows the formation of the raised side walls of the sope.

Figure 4:
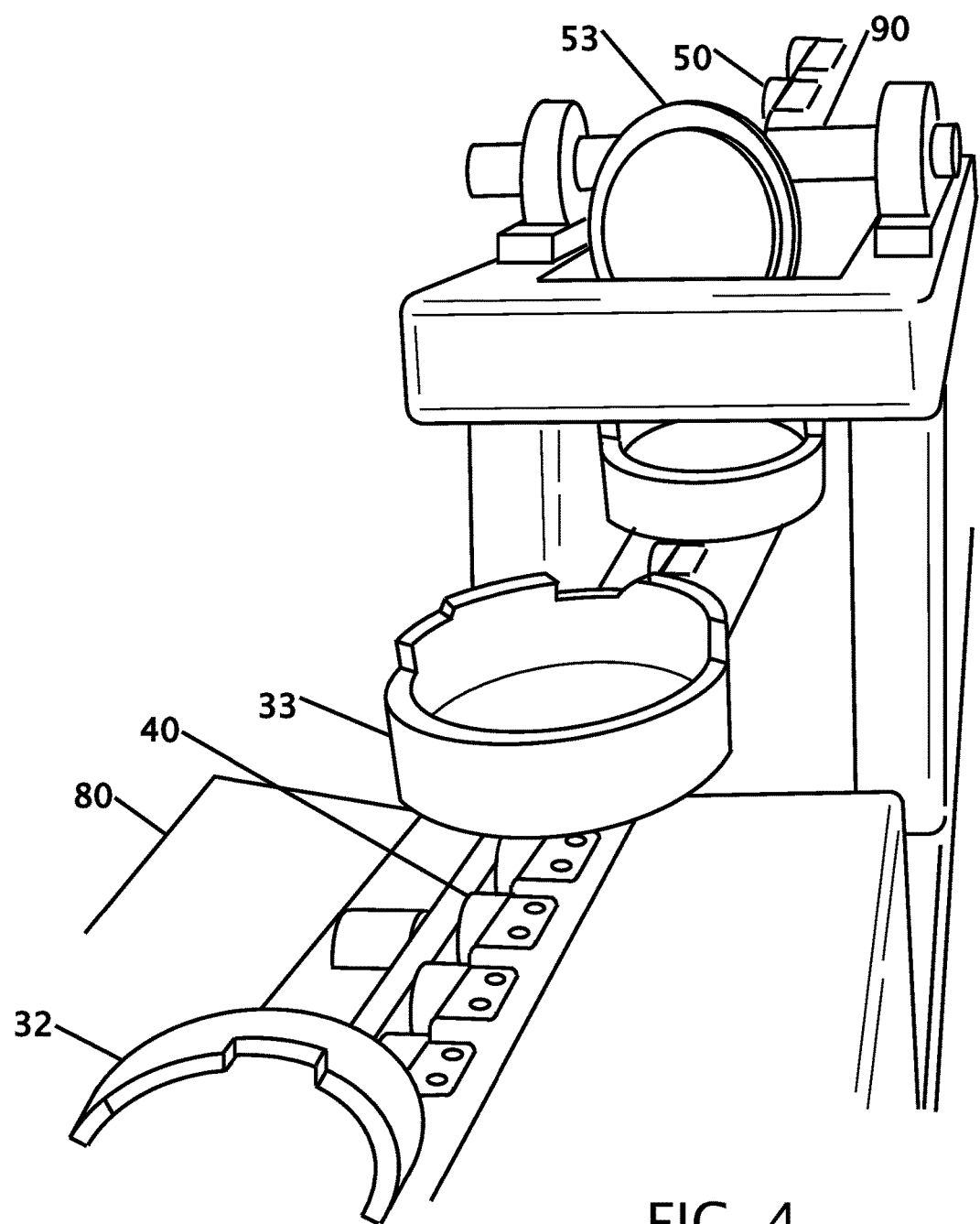
FIG. 4 shows a perspective view of the complete sope making machine as fabricated.

FIG. 4 shows a perspective view of the complete sope making machine as fabricated. This view is from the gordita loading side of the machine. Links 40 of the primary reciprocating drive are seen between the two female dishes 32 and 33. The primary reciprocating linked drive 40 has a plurality of female receiving dishes 32 and 33 secured to thereon. In the upper portion of this figure the secondary reciprocating linked drive 50 is seen where the secondary reciprocating linked drive is secured to the male forming die 53.

The primary reciprocating linked drive 40 is synchronized to the secondary reciprocating linked drive 50 whereby when a male forming die 53 engages with female receiving dishes 33 and they progress through the machine. When a gordita is placed into one of the female receiving dishes 33 and a male forming die 53 engages into the female receiving dishes 33 the gordita is formed into dishes to make a dished sope. A drive motor moves the primary 40 and secondary 50 linked belts. These figure further shows pillow blocks that support an idler or drive shaft 90 where the linked belt 50 rotates around. This figure further shows one of the leveling platforms 80 that support the distal side edges of the female receiving dishes 33. Because the female receiving dishes 33 are (essentially) only supported from the center of the female receiving dishes 33 the female receiving dishes 33 are susceptible to side-to-side tipping and the leveling guides 80 ensure that the female receiving dishes 33 are horizontal when the gordita is placed onto the female receiving dishes 33, and a second set of leveling guides level the female receiving dishes 33 when the male forming die 53 engages with a female receiving dishes 33.

Thus, specific embodiments of a sopes dish forming machine have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A sope dish forming machine comprising:
a primary reciprocating drive;
said primary reciprocating drive having a plurality of female receiving dishes secured to a primary continuous linked belt thereon;
said plurality of female receiving dishes having a circular, generally flat bottom with generally vertical elevated side walls surrounding said flat bottom;
a secondary reciprocating drive;
said secondary reciprocating drive having at least one male forming die secured to a secondary continuous linked belt that has a different number of links as said primary continuous linked belt thereon;
said at least one male forming die having a generally flat outer surface with generally perpendicular side walls surrounding said flat bottom and;
said primary reciprocating drive being synchronized to said secondary reciprocating drive whereby said at least one male forming die is configured to engage with at least one of said plurality of female receiving dishes after a gordita is placed into said at least one of the plurality of female receiving dishes thereby forming said gordita into the sope dish.

2. The sope dish forming machine according to claim 1 further includes at least one set of leveling guide plates that levels said one of said plurality of female receiving dishes while said at least one male forming die is engaged with said one of said plurality of female receiving dishes as said female receiving dishes slide over said at least one set of leveling guide plates.

3. The sope dish forming machine according to claim 1 further includes at least one set of leveling guide plates that levels said one of said plurality of female receiving dishes while said at least one male forming die has a gordita being placed on said female receiving dishes as at least one said male forming die slides over said at least one set of leveling guide plates.

4. The sope dish forming machine according to claim 1 wherein said machine includes a dissimilar number of said female receiving dishes from said male forming die(s).

5. The sope dish forming machine according to claim 1 wherein said machine includes an equivalent number of said female receiving dishes from said male forming die(s).

6. The sope dish forming machine according to claim 1 wherein said female receiving dishes have a relieved leading edge that is configured to clear a leading edge of said male die.

7. The sope dish forming machine according to claim 1 wherein said female receiving dishes have a relieved trailing edge that is configured to clear a trailing edge of said male die.

8. The sope dish forming machine according to claim 1 wherein said male forming dish is configured to roll into said female receiving dishes.

9. The sope dish forming machine according to claim 1 wherein said machine operates with a drive motor that continuously drives said female receiving dishes and said male forming dishes.

10. The sope dish forming machine according to claim 9 wherein said drive motor is a variable speed drive motor.

11. The sope dish forming machine according to claim 1 wherein said male forming dies are connected to a linked drive belt.

12. The sope dish forming machine according to claim 11 wherein said linked drive belt is driven on at least one sprocket.

13. The sope dish forming machine according to claim 1 wherein said female receiving dishes are connected to a linked drive belt.

14. The sope dish forming machine according to claim 13 wherein said linked drive belt is driven on at least one sprocket.

15. The sope dish forming machine according to claim 1 wherein said male forming die is configured to move in a synchronized to roll into a moving at least one of said female receiving dishes.

16. The sope dish forming machine according to claim 13 wherein said sopes are discarded and fall out of said female receiving dishes as said female receiving dishes revolve on said linked drive belt.

17. The sope dish forming machine according to claim 1 wherein at least one of said male forming die is configured to move and dwell in a moving at least one of said female receiving dish as said gordita is formed in said sope.

18. The sope dish forming machine according to claim 13 wherein at least one of said male forming die and at least one of said female receiving dish is changeable on said linked drive belt.

19. The sope dish forming machine according to claim 1 wherein forming machine forms said gordita with a recessed center area with elevated sides.

* * * * *